March 14, 1967 S. K. YEE ETAL 3,308,956
AXIAL FLOW OIL FILTER HAVING SEALING MEANS
Filed April 3, 1963 2 Sheets-Sheet 1
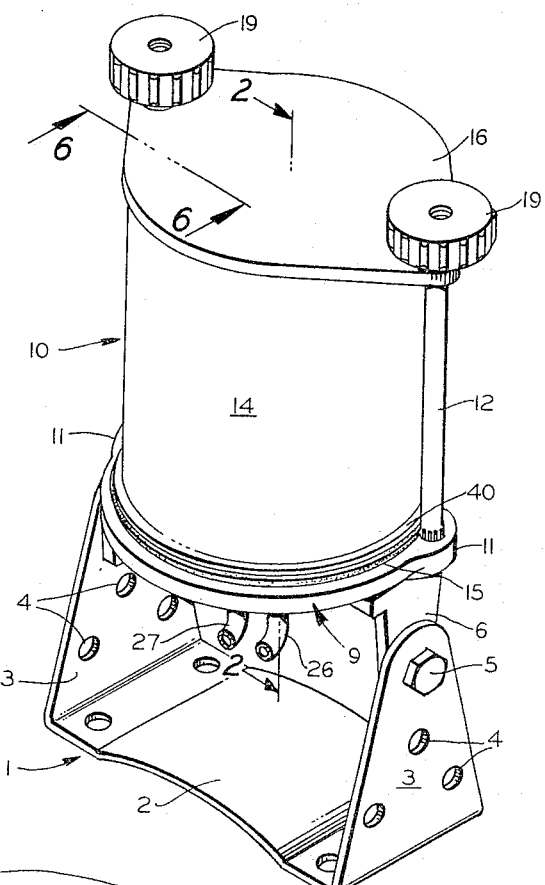
FIG_1
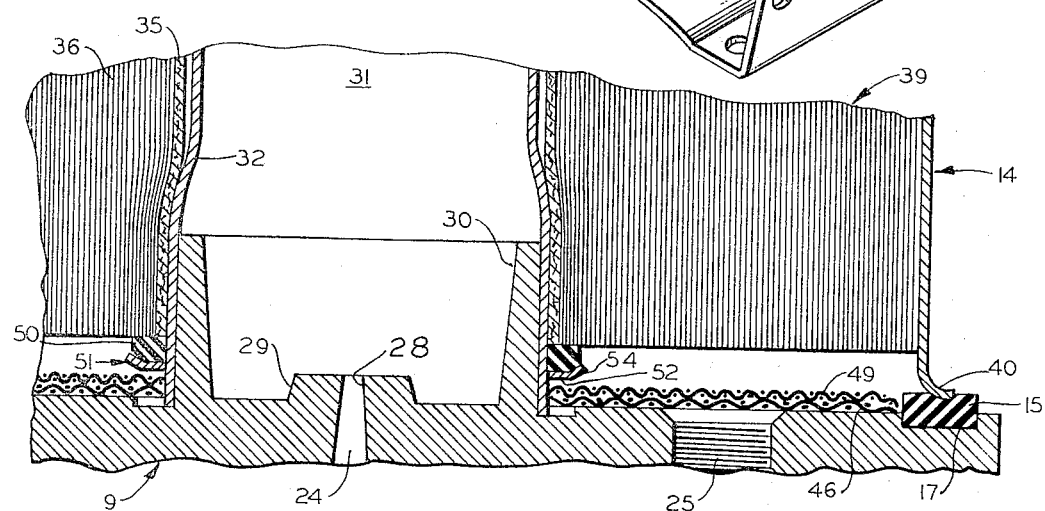
FIG_3
INVENTORS
JOHN M. FRANTZ
SKIPPER K. YEE
BY
Boyken, Mohler + Foster
ATTORNEYS

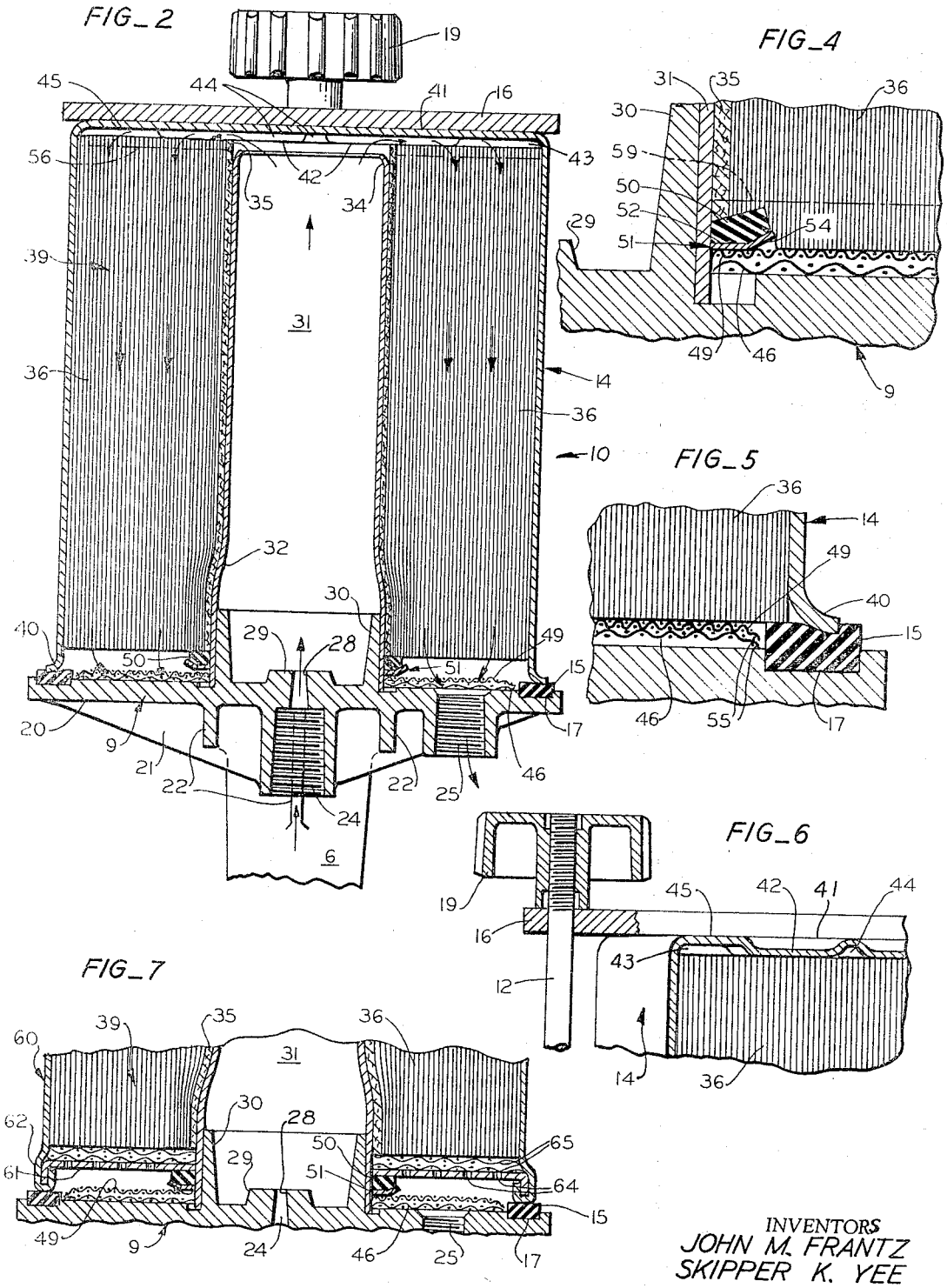

United States Patent Office 3,308,956
Patented Mar. 14, 1967

3,308,956
AXIAL FLOW OIL FILTER HAVING SEALING MEANS
Skipper K. Yee, Stockton, Calif., and John M. Frantz, Dallas, Oreg., assignors to Sky Center Corporation, Stockton, Calif., a corporation of California
Filed Apr. 3, 1963, Ser. No. 270,288
5 Claims. (Cl. 210—232)

The present invention relates generally to oil filters and more particularly to an improved oil filter of the bypass type which is adapted to be used in conjunction with an internal combustion engine. This application is a continuation-in-part of application Ser. No. 852,671, filed Nov. 13, 1959, and now abandoned.

The primary object of the present invention is to provide an oil filter that is simple and economical in both manufacture and use and which is extremely reliable and efficient.

It is also an object of this invention to provide an oil filter which can interchangeably use what is known in the art as a repack filter element as well as a self-contained or throw-away filter element.

Another object of this invention is to provide an oil filter and filtering element which makes possible heretofore unobtainable ease and speed of replacement.

Yet another object of this invention is to provide an oil filter in which there is allowance for compaction of the filtering element which increases both the sealing and filtering efficiency of the oil filter.

Still another object of this invention is the provision of sealing means which increases in efficiency as pressure in the lubrication system increases and as compaction of the filtering element occurs.

Other objects and advantages of the present invention will be apparent from the specification taken in conjunction with the drawings, in which:

FIG. 1 is an isometric view of one form of the assembled oil filter of this invention and the associated bracket by which said filter is mounted for use;

FIG. 2 is a vertical cross sectional view taken along line 2—2 of FIG. 1 and showing the filter element before compaction;

FIG. 3 is an enlarged fragmentary cross sectional view similar to the lower portion of the oil filter of FIG. 2;

FIG. 4 is a greatly enlarged fragmentary cross sectional view of the central portion of FIG. 2 illustrating the effect of compaction of the filter element;

FIG. 5 is a greatly enlarged fragmentary cross sectional view of the lower right hand corner of FIG. 2 after compaction of the filter element;

FIG. 6 is an enlarged fragmentary cross sectional view taken along line 6—6 of FIG. 1 and with a portion thereof broken away for clarity; and FIG. 7 is a fragmentary vertical cross sectional view of the lower portion of a modified form of the present invention incorporation of a self-contained filter element.

In general the filter of this invention is of the type known as a bypass oil filter, which may be operatively connected at any point in the lubrication system of an automobile or truck internal combustion engine. This oil filter is designed to be extremely efficient in the filtration of solid particles and other impurities from oil by using a tubular filter element which comprises a plurality of circumferentially arranged layers of thin, tightly packed, fibrous material contained in a relatively restricted space. The oil filter creates considerable resistance to the flow of oil therethrough. Further, the oil filter must be relatively compact in order to fit into available space under the hood of an automobile. Thus, due to the resistance to flow and the compact size of the oil filter, the filter can pass only a portion of the total volume of oil being circulated past the point at which the filter is connected.

The bypass oil filter of the present invention is designed to filter about ten percent of the total oil flow in an ordinary automobile engine lubricating system, which is sufficient filtration to keep the crank case oil clean at all times.

The filter of this invention must be relatively strong and efficiently sealed to withstand the pressure existing in the lubricating system which is in the vicinity of sixty pounds per square inch in a properly operating engine.

The present oil filter has a filter element such as that described above and which is economically and readily available in the form of a roll of quality toilet tissue, preferably of the soft two-ply variety. The filtering element may be contained in either a permanent canister, from which a used element is discarded and a new element is replaced, known as a repack model, or the element may be used in a less economical but slightly more convenient temporary canister which is discarded along with the used element (known as a throwaway model).

In detail, the assembled oil filter of FIG. 1 is of the repack variety and includes, as mounting means, a metal bracket 1 secured to the lower end thereof. Bracket 1 has an apertured web 2 which is adapted to be secured to any convenient surface under the hood of a motor vehicle. At either end of web 2 and extending upwardly therefrom are flanges 3 which are apertured, as at 4.

Inwardly of the upper ends of flanges 3 and secured thereto by bolts 5 are a pair of depending apertured flanges 6 which are integrally secured to metal baseplate 9 of the filter container assembly 10.

For purposes of replacing used filter elements it is desirable to have the filter container assembly 10 mounted upright, or as nearly so as possible, within the motorwell of the vehicle. Therefore it makes no difference where bracket 1 is mounted under the hood or what the angular disposition of web 2 is for the filter assembly can be moved to an upright position before bolts 5 are tightened. In order to conform to available space within a particular motorwell, flanges 6 can be secured to bracket 1 at any of the apertures 4 in flanges 3.

As seen in FIGS. 1 and 2, baseplate 9 is generally circular and flat. Said baseplate is reinforced on its lower surface 20 by a downwardly depending pattern of ribs. One of such ribs 21 is shown in elevation in FIG. 2 and said rib intersects a plurality of ribs 22 extending at right angles thereto. The middle intersecting rib 22 extends outwardly to and is formed integrally with and reinforces flanges 6.

Baseplate 9 is formed with a pair of internally threaded openings 24, 25. Opening 24, at the center of baseplate 9, is the inlet opening through which the oil which is bypassed from the engine enters the filter. Opening 25, located radially outwardly of the opening 24 and inwardly of the periphery of baseplate 9, is the outlet opening through which filtered oil returns to the lubricating system of the engine.

The upper restricted diameter end 28 of inlet 24 opens through a raised nipple 29 (FIG. 2) on the upper surface of baseplate 9 into a hollow boss 30 which is integrally formed with said baseplate. Around the outer surface of boss 30 and in tight, press fit engagement therewith is the lower end of a hollow, tubular core 31 which extends upwardly from baseplate 9 as substantial part of the height of filter container assembly (10) and provides means for conducting oil axially through said container assembly. Core 31 is swaged inwardly a short distance above the top of boss 30 as at 32, to provide a lower portion of larger diameter and an upper portion of smaller diameter. Said core is also swaged inwardly at the open upper end thereof, as at 34.

Snugly surrounding core 31 and extending slightly above the upper swaged end 34 thereof is a hollow cardboard tube 35 around which is wrapped a plurality of circumferentially arranged layers of thin, tightly packed fibrous material 36. Said layers of fibrous material are preferably a roll of toilet tissue which forms the filter element, generally designated 39, of the present oil filter.

Filter element 39 extends radially outwardly of core 31 into snug engagement with the seamless cylindrical sidewall of an open-ended, metal conister 14, which, with baseplate 9 as an endwall therefor comprises a closed, rigid container 10 enclosing said filter element.

The upper end of canister 14 is closed with an integral endwall 41 formed with spaced, depressed quadrants 42 (FIG. 6) therein which provide intersecting channels 44 on the inside of said canister. Depressions 42 extend somewhat short of the periphery of closed end 41 and thereby leave a raised, annular pressure receiving surface 45 (FIGS. 2, 6) on the outside of canister 14 at the periphery thereof and an annular channel 43 on the inside thereof.

The lower open end of canister 14 is flared outwardly to form a lip 40. Lip 40 is adapted to engage a circular sealing washer 15 which is secured to the upper surface of baseplate 9 in an annular recess 17.

Extending radially inwardly of sealing washer 15 and resting on the upper surface of baseplate 9 are a pair of circular screens 46, 49 which are centrally cut-out to receive the lower end of core 31. The lower screen 46 may be of a relatively large mesh while the upper screen 49 may be of a relatively fine mesh. The overlying screens 46, 49 are coextensive and cooperate to form perforate spacing means interposed between and in engagement with the lower end of element 39 and the upper surface of baseplate 9 in order to maintain clear channels of flow for oil when compaction of element 39 occurs.

Also received around the lower end of core 31 at a position between the lower end of tube 35 and the upper side of screen 49 is an elastic sealing washer 50 and a rigid backing washer 51 (FIGS. 2-4). Sealing washer 50 has a normally rectangular cross section and is made of an elastic material such as rubber. It is adapted to be stretched around and in frictional engagement with the lower end of core 31 to form a liquid tight seal between the outer side of said core and said washer. Backing washer 51 is made of metal and is positioned on core 31 and rests on screen 49. As seen in FIG. 4, backing washer 51 has an inner annular portion 52 which may be relatively horizontal and an outer peripheral portion 54 which is inclined outwardly and upwardly and extends radially outwardly slightly past the periphery of sealing washer 50 (FIG. 2).

Projecting radially outwardly of baseplate 9 and at opposite points on the periphery thereof are a pair of ears 11 (FIG. 1) which are centrally bored to receive therethrough in press-fit engagement the splined lower ends of a pair of rods 12. Rods 12 extend upwardly from baseplate 9 alongside canister 14 and past the top 41 of said canister. The upper threaded ends of rods 12 are received through bores in the ends of a generally elliptically shaped, flat, relatively thick metal press plate 16 (FIGS. 1, 6) which extends across the top of and partially conforms to the contour of the upper end of canister 14. Internally threaded knobs 19 are threadedly received on the upper ends of rods 12 over press plate 16 and when said knobs are tightened a press is created between press plate 16 and baseplate 9, and lip 40 of canister 14 is forced into sealing engagement with annular sealing washer 15. Rods 12 and knobs 19 cooperate to form a means for connecting press plate 16 and baseplate 9 in order to seal canister 14 with said baseplate 9 at sealing washer 15.

In operation, a new filter element 39 is inserted in a repack type oil filter (FIGS. 1-6) by first removing knobs 19 and press plate 16 and then removing canister 14 upwardly from around core 31. If a used element is in the filter it will be withdrawn with the canister and can be removed and discarded. A new element 39 is then pressed snugly into canister 14 until it makes contact with depressions 42 and the canister and new element is replaced over core 31. Swaging 34 on the upper end of core 31 serves as a guide for tube 35 of element 39 and assures that the canister and new element will be readily positioned over core 31.

The inside diameter of tube 35 varies slightly in the different brands of toilet tissue on the market. The smaller diameter upper end portion of core 31 is swaged inwardly at 32 to slidably receive thereon in close engagement a roll of toilet tissue having the smallest normal diameter central tube (FIG. 2). The diameter of the lower end portion of core 31 is slightly larger than the largest diameter central tubes in toilet tissue, as is illustrated in FIG. 3. When a new filter element 39 is inserted over core 31 the latter will spread the central tube 35 somewhat so that it closely hugs core 31, at least at the lower end portion thereof (FIG. 3). Such close engagement of tube 35 and core 31 effects an oil-tight seal therebetween.

Press plate 16 is replaced over the top of canister 14 and on the upper ends of rods 12 and knobs 19 are replaced on rods 12 and tightened with approximately equal force in order to assure a uniform seal between washer 15 on baseplate 9 and lip 40 on canister 14. A substantial portion of the force applied to the upper end 41 of canister 14 by press plate 16 will be received by annular surface 45 (FIGS. 2, 6) at the periphery of upper end 41 and will be transmitted through the sidewall of said canister to the line of engagement between lip 40 and annular sealing washer 15. Thus the press created by tightening knobs 19 on rods 12 will be transmitted through the strongest part of canister 14, the sidewall, and will not tend to deflect the central portion of upper end 41.

When the periphery of the sidewall of canister 14 is in sealed engagement with baseplate 9, container assembly 10 is formed enclosing element 39 with baseplate 9 as one end of container 10 and integral endwall 41 as the other end thereof.

Engine oil enters the filter under pressure through inlet 24 and passes through the restricted diameter upper end 28 thereof into hollow boss 30 and core 31. The diameter of end 28 of inlet 24 is restricted to a degree that it will allow only as much oil into the filter as the filter is capable of processing. Thus the pressure in the oil filter is maintained at the pressure of the remainder of the lubricating system by restricting the volume of oil entering the filter.

Oil passing through the filter follows a direction of flow indicated by the arrows in FIG. 2. Core 31 conducts the oil from inlet 24 to the upper end of element 39 whence the oil flows axially through the layers 36 of element 39 to outlet 25 at the lower end of said element. From the open end of core 31, oil passes through intersecting channels 44 and annular channel 43 over the uppermost edge of the thin layers of filter material 36 and down into the filter element 39. It should be noted that since new element 39 is inserted into canister 14 until it engages depressions 42, channels 43, 44 facilitate uniform distribution of the initial flow of oil from core 31 radially across the upper ends of the layers 36 of element 39.

As element 39 is subjected to the pressures of engine oil and becomes saturated, it tends to compact toward baseplate 9 and offer increased resistance to the passage of oil therethrough. As resistance to the passage of oil increases, due to compaction, the oil tends to seek an easier path through the filter than between the layers 36 of element 39. The path offering least resistance would be for oil to seep between core 31 and tube 35. The close engagement between said core and said tube, at least at the lower ends thereof, will prevent such seepage during the initial flow of oil into a new element 39. However, as pressure in the filter increases the tendency toward such seepage will increase. As this happens tube 35 and the inner layers of filter material 36 are compacted downwardly and apply force on the upper surface of sealing washer 50 (FIG. 4). When such force is applied to sealing washer 50, said washer presses downwardly onto backing washer 51. Since sealing washer 50 is elastic it will tend to conform to the upwardly and outwardly inclined portion 54 of backing washer 51 and sealing washer 50 will be curled inwardly and press with even greater force onto the outer side of the lower end portion of core 31, thereby increasing its sealing efficiency against the seepage of oil between core 31 and tube 35.

As pressure in the filter and the tendency toward seepage between core 31 and tube 35 increases, the efficiency of sealing washer 50 correspondingly increases to prevent any such seepage and the oil will be forced through the layers 36 of the filter element 39. Thus, sealing washer 50 and backing washer 51 form a sealing means to provide a fluid-tight seal between core 31 and tube 35.

It should be noted that compaction is desirable in the present oil filter and allowance is made for compaction since it aids in properly and efficiently sealing the filter against seepage. Also it is obvious that the closer the fibers of filter material 36 are compacted together, the greater the degree of filtration will be.

As compaction of element 39 occurs the lower edges of the layers of filter material 36 settle onto screens 46, 49 (FIGS. 4, 5) which are interposed between said material and the upper surface of baseplate 9 in order to maintain clear channels of flow for filtered oil to outlet 25. Screens 46, 49 therefore function as perforate means spacing the lower end of filter element 39 from baseplate 9 and also prevent pieces of the filter material from entering the lubricating system.

As seen in FIGS. 2, 3 and 5, screens 46, 49 are cut from their respective stock of screen material in such a manner that the outer peripheral edges of said screens are bent downwardly, as at 55. Screens 46, 49 are positioned over baseplate 9 with their edges 55 bent downwardly away from the lower end of filter element 39 to assure that the jagged edges of said screens will not become entangled with the filter material 36 when it becomes compacted thereover. Further, screens 46, 49 are cut to a smaller diameter than the inside diameter of sealing washer 15 (FIG. 5). This precludes any possibility that said screens will accidentally get between lip 40 of canister 14 and sealing washer 15 and interfere with a perfect seal.

When filter material 36 becomes compacted against screens 46, 49 it may tend to lift said screens with it when the filter element is removed. However, since sealing washer 50 is in frictional engagement with core 31 it retains screens 46, 49 in place on baseplate 9 and causes a separation of filter material 36 from said screens.

As seen in FIG. 2, when compaction of element 39 occurs the layers of material 36 will be compressed downwardly to approximately the level of dot-dash line 56. Oil will thereafter flow freely from core 31 into the space above filter element 39.

In FIG. 4 dot-dash line 59 indicates approximately the original level of the lower surface of a new filter element 39 before compaction occurs, the full line indicating the lower end of the element after compaction.

In FIG. 7 a self-contained disposable or throw-away type of filter element is illustrated. This form of the oil filter is just as efficient as the repack model and is, of course, more convenient to the user, however, it is also less economical to the user. In this form of the oil filter, the canister as well as the used filter element are discarded when it is time for them to be replaced.

In FIG. 7 only the lower portion of the throw-away filter is shown since it is to be understood that the upper portion is the same as canister 14 of FIGS. 2 and 6 with its channels, depressed quadrants and raised peripheral portion. Further it is to be understood that the same baseplate 9, sealing washer 15, core 31, screens 46, 49, backing washer 51 and sealing washer 50 are used with both the repack and throw-away filter elements, and said elements can be used interchangeably in the same installation.

Filter element 39 is the same in the throw-away model as in the repack model, however, since the throw-away model is assembled by the manufacturer, toilet tissue with a central tube 35 of the smallest diameter can always be used. As pointed out previously this will provide engagement between tube 35 and core 31 for the entire length of said core and therefore insure better sealing therebetween.

Element 39 is enclosed within a sufficiently strong but temporary cylindrical canister 60 that is similar to canister 14 of the repack filter. Canister 60 may be of a thinner or less expensive metal such as aluminum since it will be used only once. Since the material of canister 60 may be thinner or softer than that of canister 14 it may tend to give under the internal pressures and the pressure of press plate 16 if the lower end is left open as with canister 14. Therefore the lower end is closed with an end plate 61 which is sealed to canister 60 at chime 62. End plate 61 has the center cut out so that it may be received on the lower end of core 31, and it is perforated, as at 64, in order to pass the filtered oil from the element. End plate 61 and chime 62 strengthen the lower end of canister 60.

Compaction occurs in the throw-away filter just as in the repack filter. Thus screens 65, both of which may be of relatively wide mesh, are positioned between the lower surface of element 39 and the upper surface of end plate 61 to space the same apart in order to maintain free channels of flow for filtered oil to perforations 64 and thence out of the filter. Further, the combination of screens 65 and perforated plate 61 forms perforate spacing means interposed between the lower end of element 39 of the throw-away filter and the upper surface of baseplate 9 similar to the manner in which screens 46, 49 form such perforate spacing means in the repack filter.

Screens 46, 49 are left on baseplate 9 when a throw-away filter is used as a matter of convenience so that they will not be misplaced in the event that the repack filter will be used at a later time and for providing additional screening of the oil.

Sealing washer 15, backing washer 51 and sealing washer 50 serve the same purposes when used in conjunction with the throw-away filter. In this instance end plate 61 absorbs the majority of the pressure of compaction of element 39. However, end plate 61 also presses downwardly on the upper surface of sealing washer 50 to supply the force causing washer 50 to conform to the shape of backing washer 51 and therefore press with greater sealing efficiency against the outer surface of core 31.

The illustration of the layers 36 of the filter element in FIGS. 4 and 5 is semidiagrammatic. In actual practice the layers 36 become distorted upon compaction of the filter element 39 into uneven ripples or ridges extending circumferentially of the layers. Such layers would actually appear as wavy lines in the sections of FIGS. 4 and 5.

The thus distorted filter layers further impede the flow of impure oil through element 39 thereby resisting "channeling" (separation between adjacent layers 36) and assisting in trapping solid impurities in the oil. The

We claim:
1. An oil filter assembly comprising:
   (a) a tubular filter element having a plurality of layers of thin, tightly-packed fibrous material arranged circumferentially of a hollow tube and adapted to filter oil passing axially through said layers;
   (b) a rigid container enclosing said element having a cylindrical sidewall and one endwall integral with said sidewall and the other endwall in sealed engagement with said sidewall at the periphery thereof;
   (c) means for conducting oil axially from one end of said filter element adjacent said one endwall of said container through said layers of fibrous material to the other end of said filter element adjacent said other endwall of said container, including,
      (1) a hollow, cylindrical core extending axially through said tube from said other endwall to an open end adjacent said one endwall;
      (2) said core being swaged inwardly intermediate the ends thereof to provide portions of larger and smaller diameter respectively adjacent said other endwall and said one endwall, said portions being respectively slightly larger than and substantially the same as the diameter of said tube for receiving the same in close sealing engagement.

2. The combination of claim 1, including:
   (d) sealing means interposed between said other endwall and said other end of said filter element and extending around and in frictional engagement with said portion of larger diameter of said core to provide an oil-tight seal at the other end of said tube.

3. An oil filter assembly comprising:
   (a) a tubular filter element having a plurality of layers of thin, tightly-packed fibrous material arranged circumferentially of a hollow tube and adapted to filter oil passing axially through said layers;
   (b) a rigid container enclosing said element having a cylindrical sidewall and one endwall integral with said sidewall and the other endwall in sealed engagement with said sidewall at the periphery thereof;
   (c) means for conducting oil axially from one end of said filter element adjacent said one endwall of said container through said layers of fibrous material to the other end of said filter element adjacent said other endwall of said container;
   (d) perforate spacing means interposed between and in engagement with said other end of said filter element and said other endwall of said container preventing engagement therebetween and maintaining channels of flow therebetween upon compaction of said filter element toward said other endwall by fluid flowing therethrough;
   (e) said means for conducting oil including a hollow, cylindrical core extending axially through said tube from said other endwall to an open end adjacent said one endwall; and
   (f) sealing means interposed between said spacing means and said other end of said filter element and extending around and in frictional engagement with said core to provide an oil-tight seal at the other end of said tube and for retaining said spacing means on said other endwall of said container.

4. An oil filter assembly comprising:
   (a) a tubular filter element having a plurality of layers of thin, tightly-packed fibrous material arranged circumferentially of a hollow tube and adapted to filter oil passing axially through said layers;
   (b) a rigid container enclosing said element having a cylindrical sidewall and one endwall integral with said sidewall and the other endwall in sealed engagement with said sidewall at the periphery thereof;
   (c) means for conducting oil axially from one end of said filter element adjacent said one endwall of said container through said layers of fibrous material to the other end of said filter element adjacent said other endwall of said container, including,
      (1) a hollow, cylindrical core extending axially through said tube from said other endwall to an open end adjacent said one endwall;
   (d) sealing means interposed between said other endwall and said other end of said filter element and extending around and in frictional engagement with said core to provide an oil-tight seal at the other end of said tube, including,
      (1) a rigid backing washer having an upwardly and outwardly inclined peripheral portion; and,
      (2) an elastic sealing washer disposed on the upper side of said backing washer and around said core in sealing engagement therewith and adapted to conform to said backing washer when pressure is applied thereto, thereby increasing the sealing pressure of said sealing washer against said core.

5. An oil filter comprising:
   (a) a tubular filter element having a plurality of layers of thin, tightly-packed fibrous material arranged circumferentially of a hollow tube and adapted to filter oil passing through said layers;
   (b) a rigid canister enclosing said element having a cylindrical sidewall and an upper and a lower end, at least the upper end of which is closed by an endwall;
   (c) a flat baseplate having an upper surface;
   (d) a circular sealing washer supported on said upper surface and adapted to receive said lower end of said canister in sealed engagement therewith;
   (e) means for conducting oil axially through said element;
   (f) a press plate adapted to be secured over said upper end of said canister;
   (g) means for connecting said press plate and said baseplate for sealing said lower end of said canister to said baseplate at said sealing washer; and, wherein
   (h) said endwall at said upper closed end of said canister is integral with said sidewall and is formed with a raised, annular surface at the periphery thereof for transmitting a substantial portion of the force applied by said press plate through said sidewall to said sealing washer.

References Cited by the Examiner
UNITED STATES PATENTS

| | | | |
|---|---|---|---|
| 1,872,430 | 8/1932 | Ericson | 210—439 |
| 2,110,009 | 3/1938 | Weidenbacker | 210—440 X |
| 2,253,684 | 8/1941 | Burckhalter | 210—439 X |
| 2,547,857 | 4/1951 | Cook | 210—439 X |
| 2,661,846 | 12/1953 | Lash et al. | 210—439 |
| 2,750,048 | 6/1956 | Hilbish | 210—232 |

REUBEN FRIEDMAN, *Primary Examiner.*

SAMIH N. ZAHARNA, *Examiner.*

F. SPEAR, *Assistant Examiner.*